Sept. 10, 1968        D. J. LEMENS        3,401,305
Y-CONNECTED SHUNT CAPACITOR BANK
Filed Jan. 5, 1966
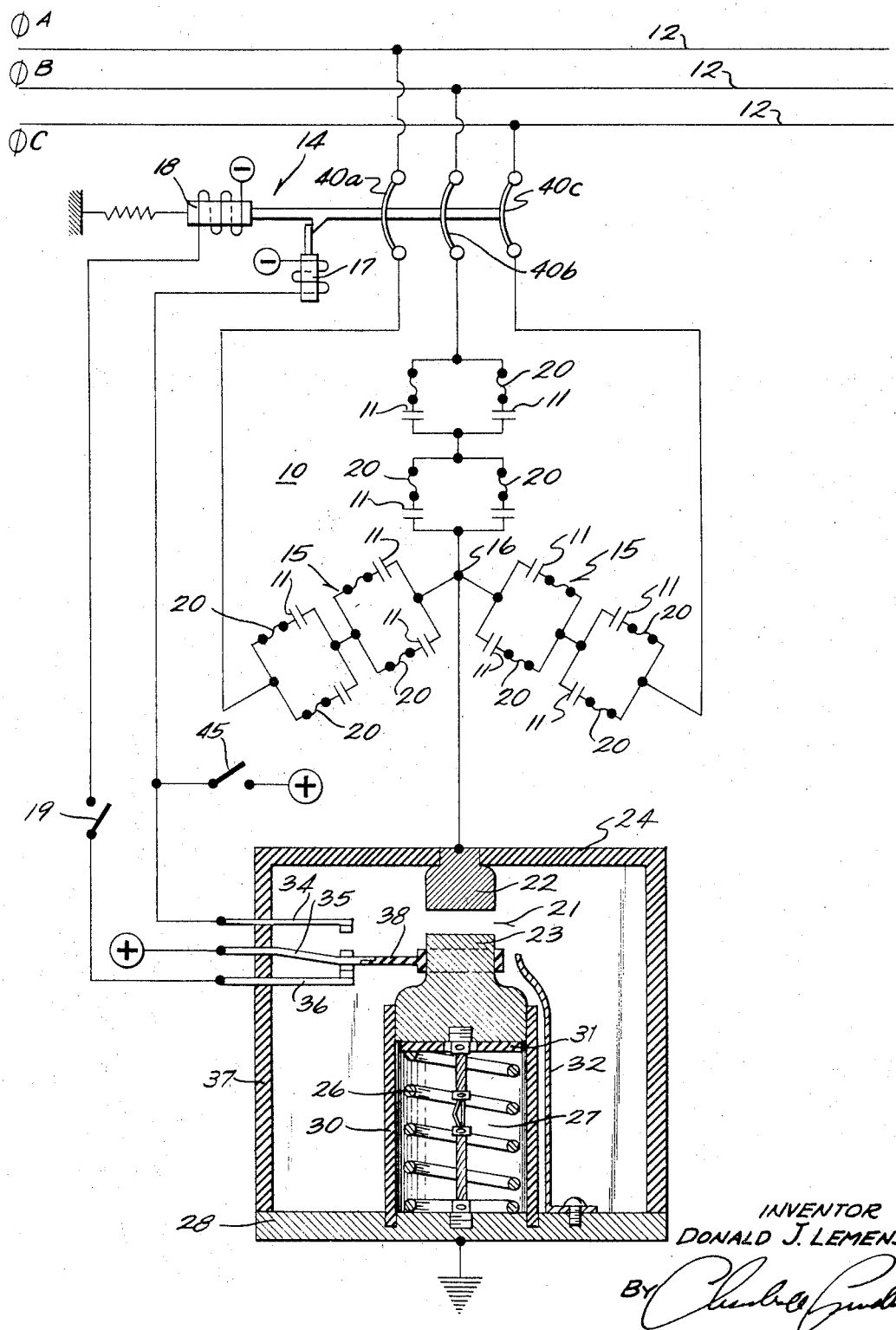
INVENTOR
DONALD J. LEMENS
ATTORNEY

United States Patent Office 3,401,305
Patented Sept. 10, 1968

3,401,305
Y-CONNECTED SHUNT CAPACITOR BANK
Donald J. Lemens, Fort Atkinson, Wis., assignor to McGraw-Edison Company, Milwaukee, Wis., a corporation of Delaware
Filed Jan. 5, 1966, Ser. No. 518,806
5 Claims. (Cl. 317—12)

ABSTRACT OF THE DISCLOSURE

A three phase Y-connected capacitor bank for electrical power lines and a capacitor bank switching system therefor including a gap connected between the neutral of the Y-connected capacitors and ground having a breakdown potential which is a minor fraction of the line-to-neutral voltage of the three phase power lines. The system includes switching means for connecting and disconnecting the capacitor bank from the power lines and further includes means for sensing unbalance in the voltage across the phase of the Y-connected capacitors and for connecting the neutral point directly to ground and disconnecting the capacitor bank from the power lines. The low breakdown potential of the gap serves to limit the maximum recovery voltage across the switching means during switching of the capacitor bank.

---

This invention relates to shunt capacitor banks for alternating current transmission and distribution systems.

It is usually desirable to star connect capacitor units for electric power transmission and distribution circuits of 4160 volts and above, and grounding the neutral of such star connected capacitor units has distinct advantages. The operation of an individual fuse or a group fuse in one phase of a small kilovar bank will not cause a serious voltage unbalance or overvoltage on the remaining units when the neutral is solidly grounded. Further, grounding the neutral of a star connected shunt capacitor bank generally permits using capacitor units having a lower insulation level than would otherwise be required. Grounding the neutral of a capacitor bank tends to minimize the possibility of ferroresonance, particularly in situations where one phase can open up on the source side of the bank. In shunt capacitor banks of small kilovar size individual fuses are usually not used, and if the neutral is not grounded, a fault in a capacitor may fail to blow the main bank fuses and result in excessive unbalance voltages and long sustained arcing in the failed unit which can cause it to rupture.

In some installations it is preferable to star connect the capacitor units and isolate the neutral of the bank, particularly if the number of units per phase in a large kilovar capacitor bank is sufficient to insure satisfactory operation of individual fuses. In power transmission and distribution systems, particularly where three phase, four wire transmission lines are used, harmonic currents will flow in the neutral conductor, and the third and higher harmonic currents may cause serious inductive interference on adjacent communication lines. If the neutral of the star connected bank is ungrounded, the ground return path for harmonic currents is eliminated and inductive interference on adjacent communication lines is substantially reduced. The fault current and the duration of arcing within a faulty capacitor unit in an ungrounded star-connected individually-fused bank is limited, thus reducing the possibility of rupturing the capacitor unit. Further, fuses with lower interrupting capacity can be used in ungrounded star connected banks, and in the event of failure of a single capacitor unit, damage to adjacent units is minimized.

Although isolation of the neutral offers the above advantages, floating neutral Y banks have the disadvantage that the recovery voltages across the contacts of the capacitor bank switch during disconnection of the bank from a grounded Y power system are considerably higher than for a grounded neutral bank. The maximum recovery voltage across the contacts of a three phase switch during disconnection of a Y bank depends upon many variables such as phase sequence, which phase opens first, and the point on the sine wave at which the first contact separates, and such maximum recovery voltage may approach four times peak line-to-neutral voltage if the neutral is ungrounded. Consequently, the capacitor switches must be of the same insulation class and voltage rating as the power system voltage, and the cost of a switch of such high voltage rating often represents a high percentage of the cost of the bank.

It is an object of the invention to provide a switched capacitor bank which has the major advantages of both grounded neutral and ungrounded neutral banks. Another object of the invention is to provide an ungrounded neutral, star connected shunt capacitor bank wherein the switch for connecting and disconnecting the bank from the power system can be designed to withstand a considerably lower recovery voltage than prior art banks and consequently the cost of the switch can be substantially reduced. It is a further object of the invention to provide such an ungrounded neutral, star connected shunt capacitor bank wherein the maximum recovery voltage demand on contacts of the capacitor bank switch is lower than in prior art banks and wherein the insulation level of the capacitor bank neutral may be considerably less than the circuit voltage. Another object is to provide such a bank wherein the maximum recovery voltage demand on the switch is lower than in known banks and which incorporates novel unbalance detection protective means for the capacitor units.

These and other objects and advantages of the invention will be more readily apparent from the following detailed description when taken in conjunction with the accompanying drawing wherein the single figure is a schematic circuit diagram of an ungrounded neutral star connected capacitor bank embodying the invention.

The invention is shown in the drawing applied to a three phase, high voltage, Y connected capacitor bank 10 comprising a plurality of capacitor units 11 connected to a three phase alternating current power line 12 by three phase switch means such as a circuit braker 14. The capacitor units 11 may be arranged in groups 15 of paralleled capacitor units and with one or more groups 15 connected in series between each phase conductor $\phi_A$, $\phi_B$ and $\phi_C$ and the neutral 16 of the Y capacitor bank. The circuit breaker 14 is illustrated as having a trip coil 17 and also having a closing coil 18 which may be controlled manually by a switch 19.

The three phases of the star capacitor bank 10 are identical, and each phase is shown as comprising two groups 15 in series and with two capacitor units 11 in parallel in each series group 15, but it will be understood that in an actual installation there may be a large number of capacitor units 11 in parallel in each series group 15 and that any desired number of groups 15 may be connected between each phase conductor $\phi$ and the neutral 16 dependent upon the voltage of the power system. Inasmuch as the impedances of the three phases are normally equal so that the capacitor bank presents a balanced three phase load to the power system, the voltages and currents of all three phases are theoretically equal and mutually displaced by 120 electrical degrees. The capacitor units 11 are protected by individual fuses 20. If one or more of the individual fuses is blown as a result of failure of the corresponding capacitor unit 11, the impedance of the group 15 which contained the faulted capacitor unit will be changed, and the voltage distribution across the three phases of the capacitor bank will vary and result in shift of neutral 16.

A protective gap 21 including a pair of spaced, relatively massive metallic electrodes 22 and 23 may be connected between neutral 16 and ground. Electrode 22 may be fixed and mounted on the cover of an insulating housing 24, and electrode 23 may be movable relative to fixed electrode 22 and normally urged toward fixed electrode 22 by a compression spring 26 and normally held against movement by a fusible element 27 which is connected at its upper end to movable electrode 23 and at its lower end to a metallic base member 28 which forms the bottom wall of housing 24 and is electrically connected to ground. Means including spring 26 and fusible element 27 are provided for detecting unbalance in the voltages of the phases of Y capacitor bank 10 and for opening circuit breaker 14 and grounding neutral 16 in the event of fault in capacitor bank 10, and preferably such means has an inverse time-current characteristic. Movable electrode 23 may be slidable axially within a tubular spring guide 30 of insulating material which is mounted on base member 28 in surrounding relation to spring 26, and an insulating washer 31 is disposed between movable electrode 23 and spring 26 to normally isolate movable electrode 23 electrically from base member 28 except for the connection through fusible element 27.

The spacing of gap 21 is such that its breakdown potential is only a small percentage of line-to-neutral voltage. For example, if power system 12 is rated at 20/34.5 kilovolts, the flashover potential of gap 21 may be adjusted to twenty percent of line-to-neutral voltage, or 4000 volts. Fusible element 27 is preferably a fuse link having a very slow characteristic, i.e., one which melts very slowly in the high current range, to provide an inverse current time characteristic for the capacitor bank unbalance detecting means. A resilient metallic contact 32 supported on and electrically connected to the grounded base member 28 has an inwardly bent portion which is in the path of movement of electrode 23 and grounds electrode 23, and thus bank neutral 16, upon operation of fusible link 27.

A pair of normally open spring contacts 34 and 35 may be mounted in spaced apart relation on an insulating sidewall 37 of housing 24, and stationary contact 34 may be connected to one side of the trip coil 17 of circuit breaker 14. The other side of trip coil 17 may be connected to the negative terminal of a source of electrical power, indicated on the drawing as "−," and the positive terminal, indicated "+," may be connected to movable contact 35. A contact actuating member 38 of insulating material may have a collar portion surrounding and affixed to movable electrode 23 and be adapted to acutate movable contact 35 into engagement with stationary contact 34, and thus complete an operating circuit to trip coil 17, when fusible element 27 operates.

In operation, when closing coil 18 is energized to actuate the movable contacts of circuit breaker 14 to closed position, the first pole to close, for example, pole 40A, will connect line-to-neutral voltage across gap 21. An inherent time interval occurs between the operation of the three poles of the circuit breaker 14, and gap 21 will spark over and carry the current until the other two poles 40B and 40C of the circuit breaker 14 close, thereby reducing the potential of neutral 16 to zero and extinguishing the arc in gap 21. Inasmuch as fuse link 27 has an inverse current-time characteristic, fuse link 27 will not melt in the time interval between the operation of the first and the last of the three poles of the circuit breaker.

When switch 45 is closed to energize trip coil 17 and open circuit breaker 14, one pole, for example, pole 40A, will open before the other two poles and the neutral 16 will begin to shift at the sixty cycle rate. When the potential of neutral 16 relative to ground exceeds the gap flashover potential, the gap 21 will break down and neutral 16 will be maintained near ground potential and will exceed it only by the voltage of the arc in gap 21. The remaining two poles 40B and 40C of the circuit breaker 14 will then open and the arc in gap 21 is extinguished.

In the event of a fault in capacity bank 10, neutral 16 will shift relative to ground. When the voltage of neutral 16 relative to ground exceeds its predetermined flashover voltage, gap 21 will break down and current will flow from electrode 22 to electrode 23 and to ground through fuse link 27. The flow of current through fuse link 27 will eventually cause it to melt, freeing electrode 23 to move under the influence of spring 26 into engagement with electrode 22. During movement electrode 23 comes into engagement with and stays in engagement with grounded contact 32 and thus connects neutral 16 to ground. Movable electrode 23 also actuates member 38 to close normally open contacts 34 and 35 and complete an energizing circuit to trip coil 17, thereby opening circuit breaker 14 and removing capacitor bank 10 from the power system 12. Contact actauting member 38 also opens normally closed contacts 35 and 36 to prevent completion of an energizing circuit to closing coil 18, thus preventing reclosing of circuit breaker 14. It will be appreciated that other auxiliary contacts controlled by member 38 can complete an alarm circuit, if desired.

Capacitor bank 10 prevents increase of the voltage of neutral 16 above the breakdown potential for gap 21 regardless of whether or not there is a fault in bank 10. Consequently the insulation of neutral 16 can be of a voltage class less than that of the power system 12, thereby materially reducing the cost of such components of the bank as the porcelain insulators which support the metallic framework of an open type bank. Further, this arrangement often permits using capacitor units 11 having a lower insulation level than that corresponding to the power system voltage. More important, however, gap 21 always maintains neutral 16 near ground potential during switching of capacitor bank 10 onto or off of power system 12 regardless of whether or not there is a fault on the power system. In a conventional ungrounded neutral Y bank the transient voltage across one pole of the circuit breaker may be up to four times peak line-to-neutral potential depending upon the phase sequence and which pole of the circuit breaker opens first. However, since gap 21 maintains neutral 16 near ground potential during switching, the maximum recovery voltage across any pole of the circuit breaker is prevented from exceeding approximately twice the line-to-neutral peak voltage. By thus reducing the maximum recovery voltage demand upon circuit breaker 14, the circuit breaker 14 can be of an insulation and interrupting voltage rating lower than that normally required, and a substantial reduction in the cost of the circuit breaker and the capacitor bank can be effected.

The disclosed capacitor bank construction also acts as an absorber for surges and disturbances that may appear on power line 12, and, in effect, constitutes a very low sparkover voltage surge attenuator which will not carry follow current.

While only a single embodiment of the invention has been illustrated and described, many modifications and variations thereof will be readily apparent to those skilled in the art, and consequently it is intended in the appended claims to cover all such modifications and variations which are within the true spirit and intent of the invention.

I claim:

1. In combination, a three phase electrical power line, a plurality of capacitor units connected in Y, three phase switch means having contact means associated with each of the phases of said power line for connecting said capacitors to and disconnecting them from said power line, and a gap connected between the neutral of said Y-connected capacitors and ground, and having a breakdown potential which is only a minor fraction of the line-to-neutral voltage of said power line, whereby the voltage of said neutral-to-ground cannot exceed the breakdown potential, and the maximum recovery voltage across said contact means is reduced during switching of said capacitors, said three phase switch means including trip coil means for disconnecting said capacitors from said power line, and means connected between said neutral and ground and being responsive to unbalance in the voltage across the phases of said Y-connected capacitors for operating said trip coil means.

2. In the combination defined by claim 1 wherein a time interval occurs between the operation of the first and the last of said three contact means and wherein said unbalance detecting means has an inverse time-current characteristic and is responsive to the flow of current between said neutral and ground through said gap for a predetermined time greater than said time interval.

3. In the combination defined by claim 2 wherein said unbalance detecting means includes means for solidly grounding said neutral.

4. In the combination defined by claim 1 wherein said unbalance detecting means includes a fusible element which melts slowly in the high range of currents connected between said gap and ground and which provides said inverse time-current characteristic.

5. In the combination defined by claim 1 wherein said gap has a pair of normally spaced apart electrodes movable relative to each other, spring means for urging said electrodes toward engagement, means for normally holding said electrodes in spaced apart relationship and being adapted, when operated, to release them for relative movement and being connected between said gap and ground and being current responsive and having an inverse time-current characteristic, and means responsive to operation of said last-named means for solidly grounding one of said electrodes.

References Cited
UNITED STATES PATENTS

| | | | |
|---|---|---|---|
| 2,799,807 | 7/1957 | Schultz et al. | 317—12 |
| 2,933,652 | 4/1960 | Cuttino | 317—12 |
| 3,248,607 | 4/1966 | Lemens | 317—12 |
| 3,348,097 | 10/1967 | Lemens | 317—12 |

LEE T. HIX, *Primary Examiner.*

J. D. TRAMMELL, *Assistant Examiner.*